United States Patent [19]

Huh

[11] Patent Number: 5,631,811

[45] Date of Patent: May 20, 1997

[54] AUXILIARY POWER SUPPLY DEVICE

[75] Inventor: Dong-Young Huh, Kyeonggi-Do, Rep. of Korea

[73] Assignee: Daewoo Electronics Co., Ltd., Seoul, Rep. of Korea

[21] Appl. No.: 601,521

[22] Filed: Feb. 14, 1996

[30] Foreign Application Priority Data

Feb. 14, 1995 [KR] Rep. of Korea ............... 1995-2641

[51] Int. Cl.$^6$ ............................................. H02M 3/335
[52] U.S. Cl. ........................... 363/21; 363/55; 363/132
[58] Field of Search ............................ 363/20, 21, 55, 363/95, 97, 132, 131

[56] References Cited

U.S. PATENT DOCUMENTS

| | | | |
|---|---|---|---|
| 4,209,826 | 6/1980 | Priegnitz | 363/21 |
| 4,677,366 | 6/1987 | Wilkinson et al. | 323/222 |
| 4,866,589 | 9/1989 | Satoo et al. | 363/21 |
| 5,341,279 | 8/1994 | Yamada | 363/21 |
| 5,424,932 | 6/1995 | Inou et al. | 363/21 |

*Primary Examiner*—Peter S. Wong
*Assistant Examiner*—Adolf Berhane
*Attorney, Agent, or Firm*—Beveridge, DeGrandi, Weilacher & Young LLP

[57] ABSTRACT

Disclosed is an auxiliary power supply device generating a constant auxiliary power. The auxiliary power supply device comprises a main power supply wherein alternating current is applied to a bridge diode, full-wave rectified, smoothed and applied to a primary winding of a transformer, an excited current of a secondary winding of the transformer is rectified, smoothed and applied to a load, the direct current power source applied to the load is applied to a control section, and a control signal for driving a switching transistor for controlling the current flowing through the primary winding of the transformer; a rectifying section for rectifying voltage outputted from the bridge diode; an auxiliary power generating section for smoothing the output voltage from the rectifying section and generating an auxiliary power source to apply to the main power supply part; and a current sink section for controlling the current in the auxiliary power generating section to output an invariable auxiliary power source regardless of the output voltage of the bridge diode so that even when the output voltage from the bridge diode varies, a constant auxiliary power source is supplied to the control section so that malfunction of the control section is avoided, and also, since the start-up section is eliminated, the auxiliary power supply device becomes simple.

11 Claims, 4 Drawing Sheets

AUXILIARY POWER SUPPLY DEVICE

BACKGROUND OF THE INVENTION

1. Field of the Invention

The present invention relates to a switching mode power supply device, and more particularly to an auxiliary power supply device for generating a constant auxiliary power source and supplying a control section of switching mode power supply device therewith.

2. Description of the Prior Art

A switching mode power supply converts an alternating current into a direct current and the direct current is applied to a load. According to the direct current applied to the load, a control signal from a control section is applied to a switching transistor and thereby the switching mode power supply device is controlled.

Such a switching mode power supply device, as shown in FIG. 1, includes a main power supply part 1 for converting an alternating current supplied from the external into a direct current and for applying that to the load and an auxiliary power generating section 2 for generating an auxiliary power Vcc to drive main power supply part 1.

At this time, an output terminal of a bridge diode 11 of main power supply part 1 for full-wave rectifying the alternating current supplied from the external is connected to one terminal of a capacitor 12 for smoothing the output voltage from bridge diode. The other terminal of capacitor 12 is connected to a ground. At the same time, one end of capacitor 12 is connected to an end of a first primary winding L1 of a transformer 13 for exciting the voltage outputted from capacitor 12.

An output terminal of bridge diode 11 is connected to a start-up section 14 composed of a resistance 14b connected with a diode 14a in series. An output terminal of start-up section 14 is connected to a control section 15 which is driven by the output voltage from start-up section 14 and controls the switching transistor. An output terminal of control section 15 is connected to a base terminal of switching transistor 16 for switching according to the control signal from control section 15 to thereby control current passing through the first primary winding of transformer 13. A collector terminal of transistor 16 is connected to an output terminal of first primary winding L1 of transformer 13. An emitter terminal of transistor 16 is connected to a ground.

An end of a secondary winding L2 of transformer 13 is connected to an anode of a diode 17 for half-wave rectifying an excited voltage from transformer 13. A cathode of diode 17 is connected to a terminal of a capacitor 18 for smoothing the output voltage from diode 17. An output terminal of capacitor 18 is connected to the other end of secondary winding L2 of transformer 13.

An end of a second primary winding L3 of transformer 13 is connected to an anode of a diode 21 of auxiliary power generating section 2. The other end of second primary winding L3 is connected to a ground. A cathode of diode 21 is connected to a terminal of a capacitor 22. One terminal of capacitor 22 is connected to control section 15 and the other terminal of capacitor 22 is connected to a ground.

According to the conventional switching mode power supply device constructed as above, the alternating current supplied from the external is full-wave rectified by bridge diode 11 of main power supply part 1. The voltage outputted from bridge diode 11 is applied to capacitor 12 to be smoothed. The voltage from capacitor 12 is applied to first primary winding L1 of transformer 13.

The voltage from bridge diode 11 is applied to diode 14a of start-up section 14 for the half-wave rectification. The rectified voltage is applied to control section 15. Control section 15 is driven according to the output voltage of resistance 14b and outputs the control signal C for switching transistor 16. The control signal C switches transistor 16 on.

If transistor 16 is turned on, current passes through first primary winding L1 of transformer 13 and the voltage from capacitor 12 excites secondary winding L2 of transformer 13. At that time, the magnitude of excited voltage is determined by a turn ratio between first primary winding and secondary winding L2 of transformer 13.

The voltage outputted from secondary winding L2 of transformer 13 is applied to diode 17 to be rectified. The voltage from diode 17 is applied to capacitor 18 to be smoothed and thereafter is applied to the load (not shown).

The voltage from capacitor 18 is applied to control section 15 and control signal C varies according to the output voltage from capacitor 18. The varied control signal C is applied to the base terminal of transistor 16 to thereby control the switching operation. Accordingly, the current passing through first primary winding L1 of transformer 13 is controlled.

Also, when current passes through first primary winding L1 of transformer 13, second primary winding L3 of transformer 13 is excited. Then the excited voltage from transformer 13 is applied to and rectified in diode 21. The voltage outputted from diode 21 is applied to and smoothed in capacitor 22. An auxiliary power source Vcc outputted from capacitor 22 is applied to control section 15.

In such a conventional switching mode power supply device, auxiliary power source Vcc applied to control section 15 varies since the excited voltage of secondary winding L3 of transformer 13 varies depending upon the alternating current inputted to auxiliary power generating section 2. Therefore, the variable auxiliary power source Vcc causes control section 15 to malfunction so the reliability of the product is lowered. And due to the separate installation of start-up section 14, the switching mode power supply device is difficult to be economized in size and weight.

SUMMARY OF THE INVENTION

Therefore, it is an object of the present invention to provide an auxiliary power supply device for preventing the malfunction of a control section by generating a constant auxiliary power supply device regardless of the fluctuation of alternating current supplied from the external.

It is another object of the present invention to provide an auxiliary power supply device eliminating a start-up section for generating an auxiliary power source to initially drive a control section so that a switching mode power supply device has a simple construction.

In order to achieve the above objects of the present invention, an auxiliary power supply device comprises:

a main power supply part including a bridge diode for full-wave rectifying an alternating power source inputted from the external, a transformer for smoothing the voltage from the bridge diode and for exciting a secondary winding via a primary winding, a diode and a capacitor for rectifying and smoothing the excited voltage of the transformer and for applying it to a load, a control section for generating a control signal to control the switching operation of a switching transistor according to an output voltage from the capacitor, and a switching transistor for controlling current flowing through the transformer by means of the control signal from the control section;

a rectifying section for rectifying voltage outputted from the bridge diode;

an auxiliary power generating section for smoothing the output voltage from the rectifying section and generating an auxiliary power source to apply to the main power supply part; and a current sink section for controlling the current in the auxiliary power generating section to output an invariable auxiliary power source regardless of the output voltage of the bridge diode.

According to a preferred embodiment of the present invention, the alternating power source inputted from the external is applied to and full-wave rectified in the bridge diode. The voltage from the bridge diode is supplied to the main power supply part, converted into a direct current power source and applied to the load. The direct current power source from the load is applied to the control section. Meanwhile, the voltage outputted from the bridge diode is applied to and rectified in the rectifying section and the voltage from the rectifying section is applied to the auxiliary power generating section to generate the auxiliary power source. The auxiliary power source is applied to the control section and generates the control signal for controlling the switching transistor according to the direct current. The voltage from the rectifying section is applied to the current sink section and controls the current passing through the auxiliary power generating section to thereby delay the output time of the auxiliary power source generated in the auxiliary power generating section. As such, even when the output voltage from the bridge diode varies, a constant auxiliary power source is supplied to the control section so that malfunction of the control section is avoided. Also, since the start-up section is eliminated, the auxiliary power supply device become simple.

BRIEF DESCRIPTION OF THE DRAWINGS

The above objects and other advantages of the present invention will be more clarified by describing a preferred embodiment thereof with reference to the accompanying drawings in which.

DESCRIPTION OF THE PREFERRED EMBODIMENT

The preferred embodiment of the present invention will now be described in detail with reference to the accompanying drawings.

Figure 1:
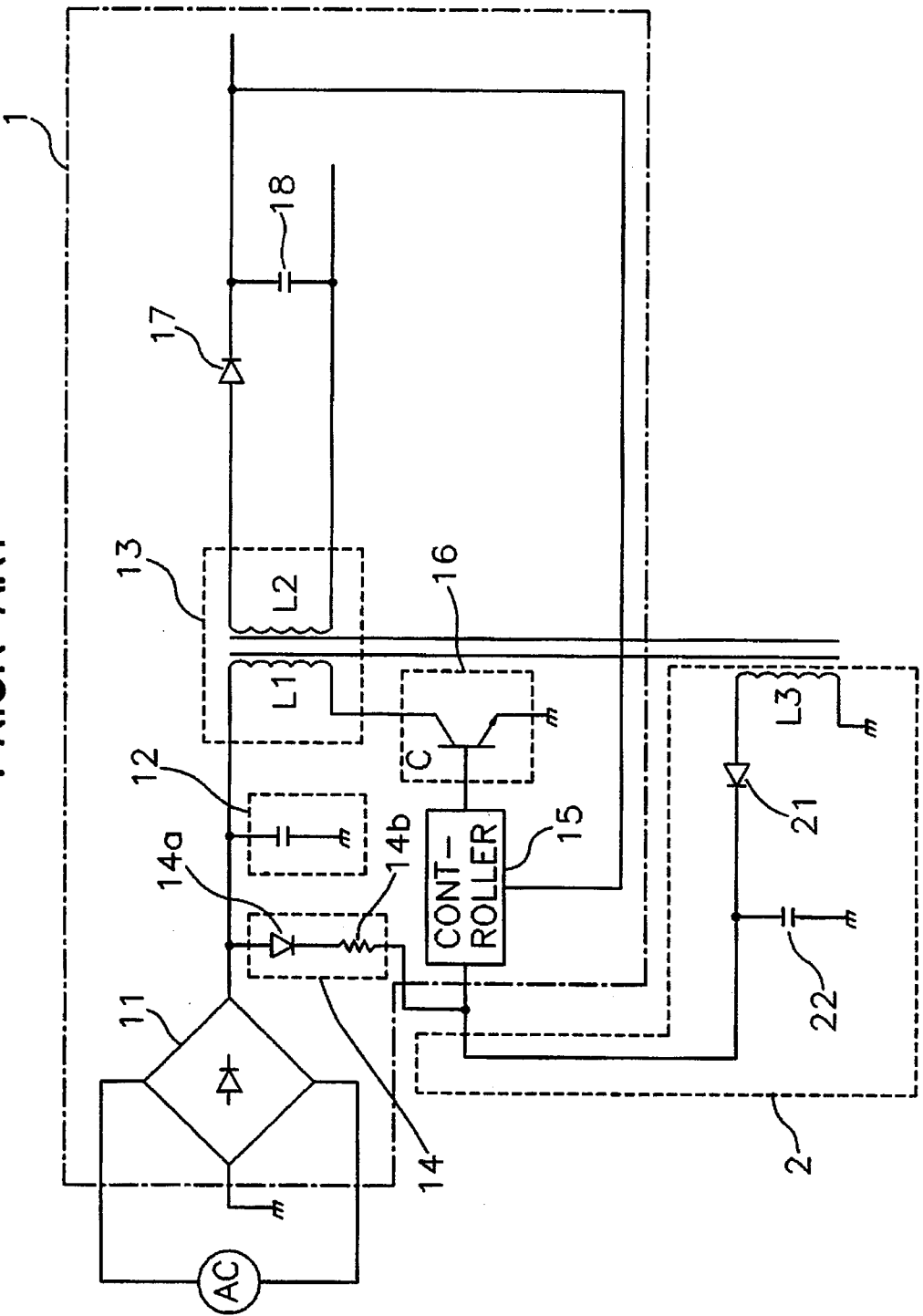
FIG. 1 is a block diagram for showing the construction of a conventional switching mode power supply device.
Figure 2:
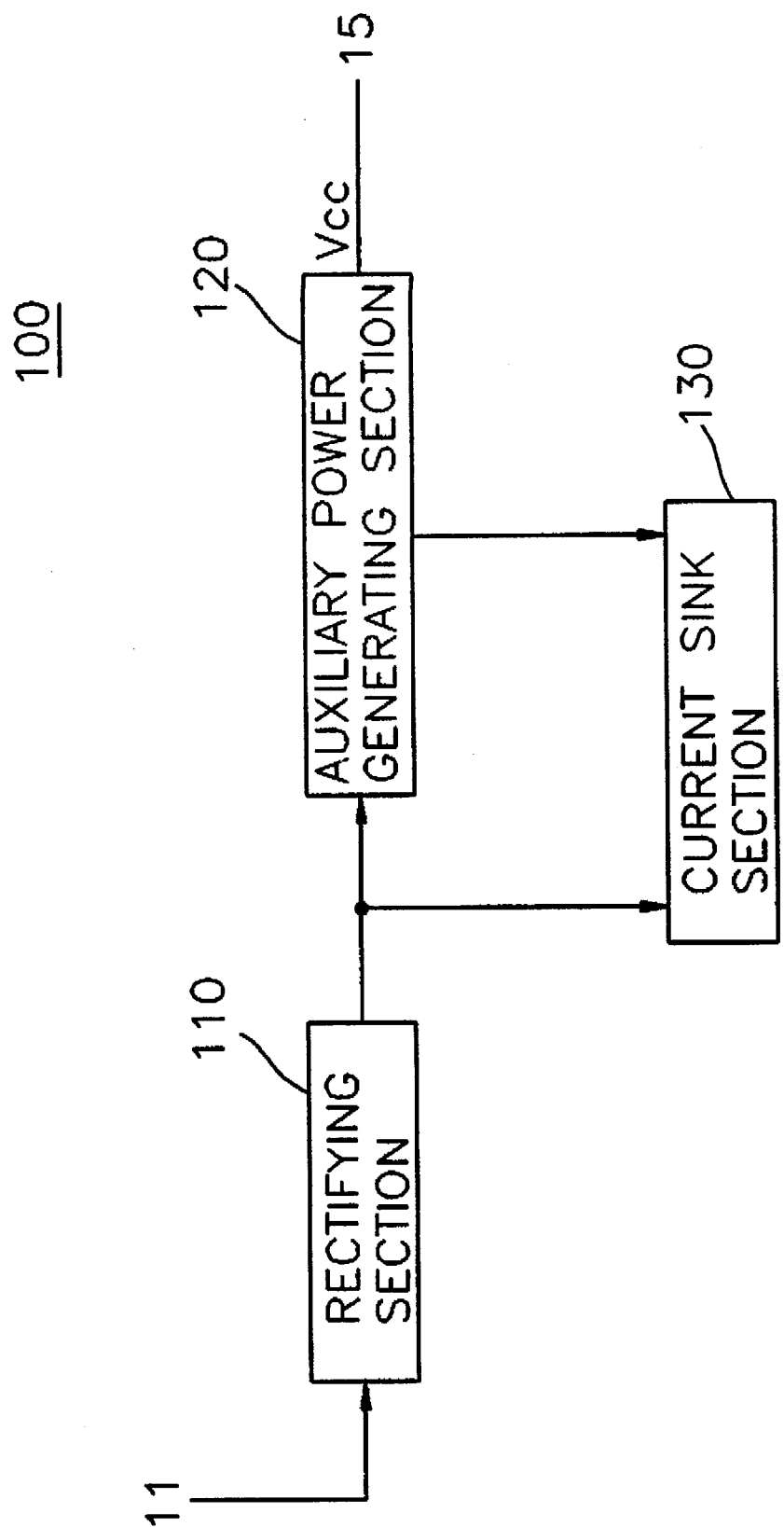
FIG. 2 is a block diagram for showing the construction of the switching mode power supply device according to the present invention.
Figure 3:
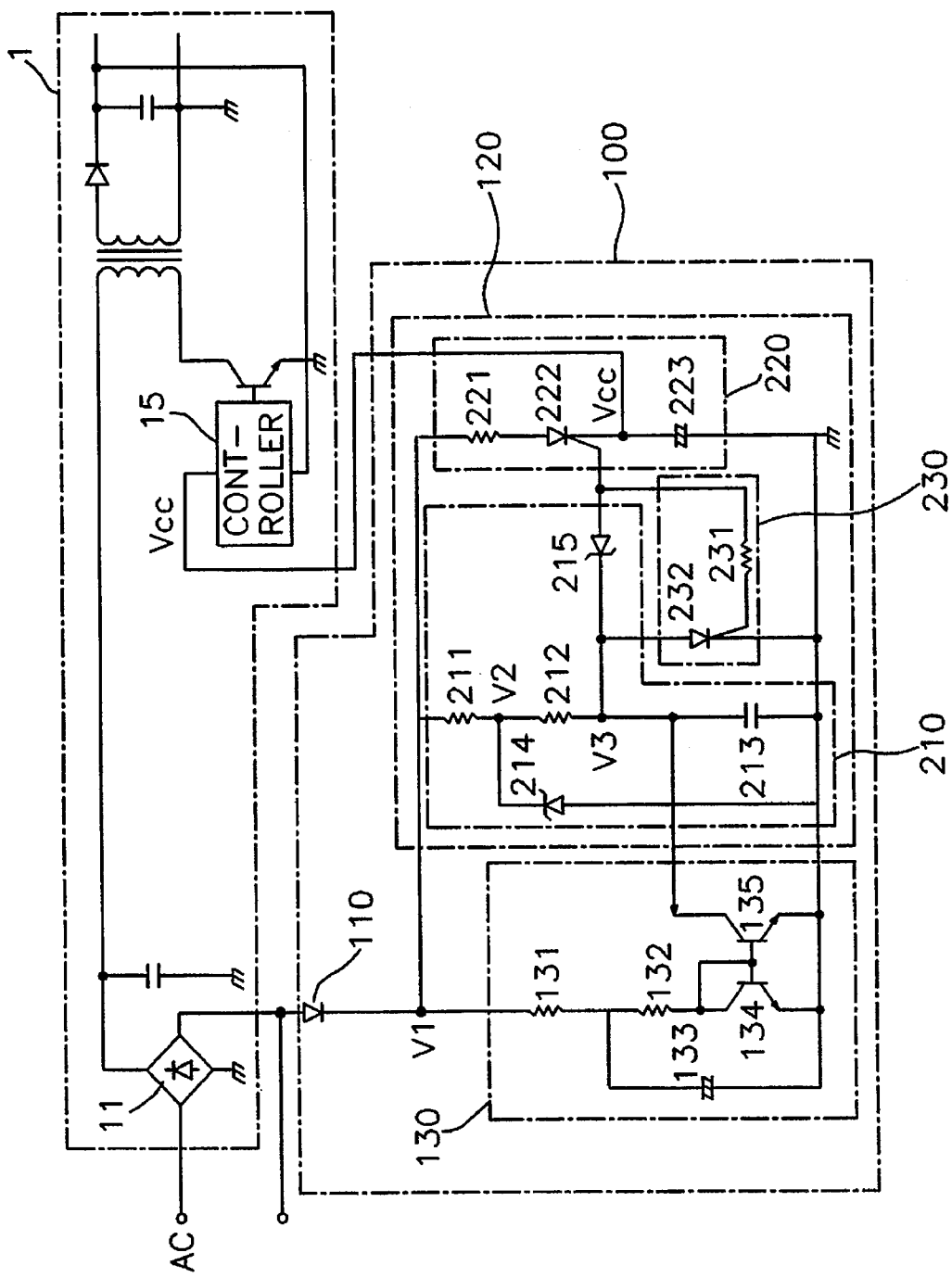
FIG. 3 is a detailed circuit diagram of the auxiliary power supply device as shown in FIG. 2.
Figure 4:
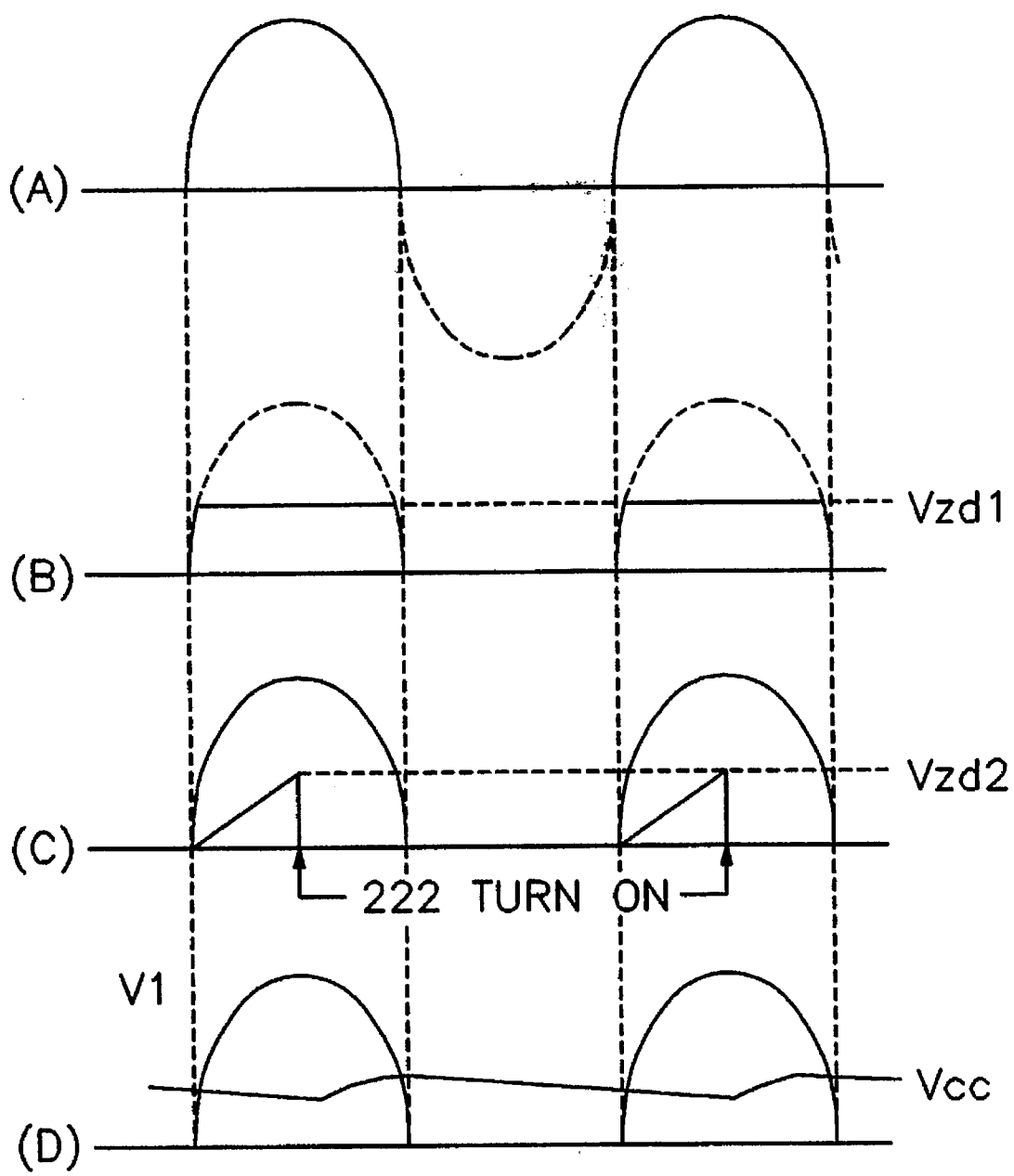
FIG. 4 (A)–(D) are wave forms for showing the output signals from each section as shown in FIG. 3.

FIG. 2 is a block diagram of an auxiliary power supply device in accordance with the present invention. FIG. 3 is a detailed circuit diagram of auxiliary power supply device 100 as shown in FIG. 2. FIG. 4 (A)–(D) are wave forms of the signals from each section as shown in FIG. 3.

As shown in the drawings, a main power supply 1 including a bridge diode 11 for full-wave rectifying an alternating current inputted from the external, a control section 15 for receiving the output signal from bridge diode, for converting the signal into a direct current, for applying the current to a load, and for generating a control signal for driving a switching transistor according to the direct current applied to the load.

Between the output terminal of bridge diode 11 and the input terminal of control section 15, an auxiliary power supply device 100 for generating an auxiliary power source Vcc to be applied to control section 15 is connected.

At this time, auxiliary power supply device 100 includes a rectifying section 110 for rectifying the output voltage from bridge diode 11, an auxiliary power generating section 120 for generating a trigger signal by charging or discharging a voltage V1 outputted from rectifying section 110 and for voltage V1 outputted from rectifying section 110 as an auxiliary power source Vcc by the trigger signal, and a current sink section 130 for controlling current applied to auxiliary power generating section 120 according to voltage V1 outputted from rectifying section 110 to generate a constant auxiliary power source Vcc.

In auxiliary power supply device 100 as shown in FIG. 3, the output terminal of bridge diode 11 is connected to rectifying section 110 composed of a diode.

Further, the cathode of the diode of rectifying section 110 is connected to auxiliary power generating section 120. Auxiliary power generating section 120 includes a trigger part 210 for generating a trigger signal by charging or discharging voltage V1 from rectifying section 110, an auxiliary power output part 220 for voltage V1 from rectifying section 110 as auxiliary power source Vcc according to the trigger signal of trigger part 210, and a reset section 230 connected to the output terminal of trigger part 210 for initializing trigger part 210 after auxiliary power source Vcc is applied to control section 15.

That is, at the output terminal of rectifying section 110, resistances 211 and 212 and a capacitor 213 are connected in series and the other end of capacitor 213 is connected to a ground. Then, the output terminal of resistance 211 is connected to the cathode of a Zener diode 214. The anode of Zener diode 214 is connected to a ground. The current outputted form resistances 211 and 212 is applied to capacitor 213 and charged and discharged therein. At that time, the discharged voltage of capacitor 213 is outputted as the trigger signal.

A terminal of capacitor 213 is connected to the cathode of Zener diode 215 and the anode of Zener diode 215 is connected to a gate terminal of a thyristor 222 of auxiliary power output section 220. Therefore, the trigger signal of capacitor 213 is applied to thyristor 222 through Zener diode 215 to thereby turn thyristor 222 on.

At that time, the anode of thyristor 222 is connected to the output terminal of resistance 221 and the input terminal of resistance 221 is connected to the output terminal of rectifying section 110. The cathode of thyristor 222 is connected to a terminal of capacitor 223 and the other terminal of capacitor 223 is connected to a ground.

The output terminal of trigger part 210 is connected to reset section 230 for fully initializing the charged voltage of capacitor 213. That is, the output terminal of Zener diode 215 is connected to a terminal of resistance 231 of reset section 230 and the other terminal of resistance 231 is connected to the gate of thyristor 232. The anode of thyristor 232 is connected to a terminal of capacitor 213 and the cathode of thyristor 232 is connected to a ground.

Also, between the output terminal of rectifying section 110 and a terminal of capacitor 213, current sink section 130 is connected. Current sink section 130 controls a time period for which capacitor 2213 charges or discharges according to voltage V1 outputted from rectifying section 110.

That is, the output terminal of rectifying section 110 is connected to resistances 131 and 132 of current sink section 130 in series. Resistance 132 is connected to a capacitor 133 in parallel. The other terminal of capacitor 133 is connected to a ground. The output terminal of resistance 132 is connected to the base and collector terminals of a transistor 134 at the same time. The emitter terminal of transistor 134 is connected to a ground and the base terminal of transistor 134 is connected to the base terminal of a transistor 135. The collector terminal of transistor 135 is connected to a terminal of capacitor 213 and the emitter terminal of transistor 135 is connected to a ground.

According to the auxiliary power supply device 100 constructed as the above, firstly, the inputted alternating current is full-wave rectified in bridge diode 11 of main power supply section 1. The output voltage from bridge diode 11 is applied to and rectified in rectifying section 110 and outputs a wave form as shown from (A) section in FIG. 4.

Then, voltage V1 outputted from rectifying section 210 is applied to capacitor 213 through resistances 211 and 212 and thereafter the voltage is charged therein. At that time, if a divided voltage V2 of resistances 211 and 212 is not less than a fixed voltage of Zener diode 214, current which is being applied to capacitor 213 is applied to a ground through Zener diode 214. Accordingly, as shown in section (B) of FIG. 4, the charged voltage of capacitor 213 is below set voltage Vzd1.

After capacitor 213 has been charged, charged voltage V3 is applied to the gate terminal of thyristor 222 through Zener diode 215 as the trigger signal. At that time, the voltage applied to thyristor 222 is not over a set voltage Vzd2 of a Zener diode 215 as shown in section (C) of FIG. 4.

Voltage V1 outputted from rectifying section 110 is applied to the anode of thyristor 222 through resistance 221. The voltage outputted from Zener diode 215 is applied to the gate terminal of thyristor 222 and thereby thyristor 222 is switched on. Accordingly, voltage V1 from rectifying section 110 which has been applied to the anode of thyristor 222 is applied to the cathode of thyristor 222.

The voltage from the cathode of thyristor 222 is applied to a capacitor 223 and smoothed therein. After that, auxiliary power source Vcc is outputted and applied to control section 15 of main power supply 1 as shown in section (D) of FIG. 4.

Since the voltage from Zener diode 215 switches thyristor 232 on by being applied to the gate of thyristor 232 via resistance 231, the charged voltage of capacitor 213 is applied to the cathode of thyristor 232 via the anode thereof and is fully removed. At that time, the switching of thyristor 232 is delayed more than the switching of thyristor 222 due to resistance 231. Accordingly, after auxiliary power source Vcc is applied to control section 15, the charged voltage of capacitor 213 is initialized.

In the meantime, if voltage V1 from rectifying section 110 is high, for example from 90 V to 270 V, the time period for which capacitor 213 is charged or discharged is reduced by reducing the amount of the current applied to capacitor 213. Therefore, if voltage V1 of rectifying section 110 is high, the voltage charged in capacitor 213 is also high, accordingly auxiliary power source Vcc is prevented from being about three times as high.

The above operational process of the embodiment is set forth in great detail hereinafter. Voltage V1 from rectifying section 110 is divided by resistances 131 and 132, applied to and smoothed in capacitor 133. The voltage outputted from resistances 131 and 132 is applied to the base of transistor 134 and transistor 134, and transistor 135 are switched on. Therefore, current flows from the collector to the emitter of transistor 134. At that time, the current flowing through resistance 132 and transistor 134 is the same amount as that applied in capacitor 133 in amount.

Also, the amount of current flowing from the collector to the emitter of transistor 134 is the same as that flowing from the collector to the emitter of transistor 135. That is, if voltage V1 from rectifying section 110 increases, the amount of current passing through resistance 132 and transistor 134 is increased, thus the amount of the current flowing from the collector to emitter of transistor 135 is increased.

As the current flowing from the collector to the emitter of transistor 135 increases, the amount of the current applied to capacitor 213 of trigger part 210 decreases, thus the time period for which capacitor 213 is charged or discharged is delayed. If the charging or discharging time period of capacitor 213 is delayed, the charged or discharged voltage of capacitor 213 is lowered and accordingly auxiliary power source Vcc is lowered. For example, if the voltage from rectifying section 110 is increased from 90 V to 270 V, auxiliary power source is increased by about three times as high. However, since the charged voltage is lowered due to the decrease of the current applied to capacitor 213, constant auxiliary power source Vcc is generated at control signal generating section 120 whatsoever the voltage from rectifying section 110 is, which is shown in section (D) of FIG. 4.

Meanwhile, if voltage V1 from rectifying section 110 is 0 V by suspending the alternating current, since voltage V1 from rectifying section 110 is lower than auxiliary power source Vcc, thyristor 222 of auxiliary power outputting section 220 is switched off and auxiliary power source Vcc is not applied to control section 15.

Also, if voltage V1 from rectifying section 110 is 0 V, the current flowing from the anode to the cathode of thyristor 232 becomes zero to initialize the charged voltage of capacitor 213. Accordingly, thyristor 232 is switched off and the operation of reset section 230 is removed.

When the auxiliary power supply device according to the present invention is used for a product, since the constant auxiliary power source is applied to the control section even when the voltage from the bridge diode varies, the control section is prevented from malfunctioning. Also, since the start-up section for generating the voltage for initializing control section is eliminated, the auxiliary power supply device becomes simple.

The present invention is not confined to the only foregoing described embodiment. It should be obvious to people skilled in the art that modifications can be made to the invention without departing from the spirit of the invention. For instance, the present invention has been set forth by describing the operation of a switching mode power supply device, however, it is applicable to other general power supply devices.

What is claimed is:

1. In a main power supply device including a bridge diode for full-wave rectifying an alternating power source inputted from the external, a transformer for smoothing the voltage from the bridge diode and for exciting a secondary winding via a primary winding, a diode and a capacitor for rectifying and smoothing the excited voltage of the transformer and for applying it to a load, a control section for generating a control signal to control the switching operation of a switching transistor according to an output voltage from the capacitor, an auxiliary power supply device for generating an auxiliary power source to drive the control section, and a switching transistor for controlling current flowing through the transformer by means of the control signal from the control section, the auxiliary power supply device comprising:

a rectifying section for half-wave rectifying the alternating power source; and an auxiliary power generating section for smoothing the output voltage from the rectifying section and generating an auxiliary power source to apply to the control section.

2. The auxiliary power supply device as claimed in claim 1, wherein the rectifying section comprises a diode for half-wave rectifying the voltage outputted from the bridge diode.

3. The auxiliary power supply device as claimed in claim 1, wherein the auxiliary power generating section includes a trigger part for generating a trigger signal by charging or discharging voltage from the rectifying section; an auxiliary power output part for outputting the voltage from the rectifying section as an auxiliary power source according to the trigger signal of the trigger part; and a resetting means for receiving the trigger signal, for applying the auxiliary power source to the control section and for initializing the trigger part.

4. The auxiliary power supply device as claimed in claim 1, wherein the current sink section comprises a current mirror for controlling amount of the current of the auxiliary power generating section.

5. The auxiliary power supply device as claimed in claim 3, wherein the trigger part includes a first resistance and a second resistance connected to each other in series for passing through the voltage outputted from the rectifying section;

a capacitor connected to the first resistance and the second resistance in series for charging or discharging the voltage from the first and second resistances;

a first Zener diode connected to the second resistance and the capacitor in parallel for limiting the charge of the capacitor in case of a divided voltage of the first resistance and the second resistance is not less than the fixed voltage; and a second Zener diode for passing through voltage outputted from the capacitor.

6. The auxiliary power supply device as claimed in claim 3, wherein the auxiliary power generating section includes a thyristor switched on by the voltage from the trigger part;

a resistance for biasing the voltage from the rectifying section; and a capacitor for smoothing the voltage from the thyristor and for outputting an auxiliary power source.

7. The auxiliary power supply device as claimed in claim 3, wherein the resetting means includes a resistance for passing through the voltage from the second Zener diode; and a thyristor for initializing the charged voltage of the capacitor of the trigger part by being switched on depending upon the voltage from the resistance.

8. The auxiliary power supply device as claimed in claim 4, wherein the current sink section includes a third resistance and a fourth resistance for passing through the voltage from the rectifying section;

a capacitor connected to an output terminal of the third resistance for smoothing the voltage from the third resistance;

a first transistor connected to an output terminal of the fourth resistance for passing through current from the collector to the emitter by being switched on depending upon the voltage from the fourth resistance; and a second transistor connected to the first transistor for controlling amount of the current of the auxiliary power generating section.

9. An auxiliary power supply device comprising:

a main power supply part including a bridge diode for full-wave rectifying an alternating power source inputted from the external, a transformer for smoothing the voltage from the bridge diode and for exciting a secondary winding via a primary winding, a diode and a capacitor for rectifying and smoothing the excited voltage of the transformer and for applying it to a load, a control section for generating a control signal to control the switching operation of a switching transistor according to an output voltage from the capacitor, and a switching transistor for controlling current flowing through the transformer by means of the control signal from the control section;

a rectifying section for rectifying voltage outputted from the bridge diode;

a trigger part for outputting a trigger signal by charging or discharging the voltage from the rectifying section;

an auxiliary power generating section for receiving the trigger signal from the trigger part and for outputting the voltage from the rectifying section as an auxiliary power source;

a resetting means for receiving the trigger signal from the trigger part, for applying the auxiliary power source to the control section and for initiallizing the trigger part; and a current sink section for controlling the current in the auxiliary power generating section to output an invariable auxiliary power source regardless of the output voltage of the bridge diode.

10. An auxiliary power supply device comprising:

a main power supply part including a bridge diode for full-wave rectifying an alternating power source inputted from the external, a transformer for smoothing the voltage from the bridge diode and for exciting a secondary winding via a primary winding, a diode and a capacitor for rectifying and smoothing the excited voltage of the transformer and for applying it to a load, a control section for generating a control signal to control the switching operation of a switching transistor according to an output voltage from the capacitor, and a switching transistor for controlling current flowing through the transformer by means of the control signal from the control section;

a rectifying section for rectifying voltage outputted from the bridge diode;

a trigger part for outputting a trigger signal by charging or discharging the voltage from the rectifying section;

an auxiliary power generating section for receiving the trigger signal from the trigger part and for outputting the voltage from the rectifying section as an auxiliary power source;

a resetting means for receiving the trigger signal from the trigger part, for applying the auxiliary power source to the control section and for initiallizing the trigger part; and a current mirror for controlling the amount of the current of the auxiliary power generating section depending upon the voltage from the rectifying section.

11. The auxiliary power supply device as claimed in claim 1, further comprising a current sink section for controlling the current in the auxiliary power generating section to output an invariable auxiliary power source regardless of the output voltage of the rectifying section.

* * * * *